(12) United States Patent
Wu et al.

(10) Patent No.: US 11,554,993 B2
(45) Date of Patent: Jan. 17, 2023

(54) HIGHLY THIXOTROPIC 3D PRINTING CONCRETE AND MANUFACTURING METHOD THEREFOR

(71) Applicants: CHINA TIESIJU CIVIL ENGINEERING GROUP, Anhui (CN); ANHUI ZHONGTIE ENGINEERING MATERIAL TECHNOLOGY CO., LTD, Anhui (CN); CENTRAL SOUTH UNIVERSITY, Hunan (CN)

(72) Inventors: Jun Wu, Anhui (CN); Jianwei Peng, Anhui (CN); Hai Huang, Anhui (CN); Juan Chen, Anhui (CN); Qiang Yuan, Hunan (CN); Jie Tang, Anhui (CN); Jianan Yao, Anhui (CN); Zhiyong Wang, Anhui (CN); Jian Yu, Anhui (CN); Yang Liu, Anhui (CN)

(73) Assignees: CHINA TIESIJU CIVIL ENGINEERING GROUP, Anhui (CN); ANHUI ZHONGTIE ENGINEERING MATERIAL TECHNOLOGY CO., LTD., Anhui (CN); CENTRAL SOUTH UNIVERSITY, Hunan (CN)

( * ) Notice: Subject to any disclaimer, the term of this patent is extended or adjusted under 35 U.S.C. 154(b) by 161 days.

(21) Appl. No.: 17/251,220

(22) PCT Filed: Jun. 4, 2019

(86) PCT No.: PCT/CN2019/090010
§ 371 (c)(1),
(2) Date: Dec. 11, 2020

(87) PCT Pub. No.: WO2019/237970
PCT Pub. Date: Dec. 19, 2019

(65) Prior Publication Data
US 2021/0355040 A1    Nov. 18, 2021

(30) Foreign Application Priority Data

Jun. 12, 2018  (CN) .......................... 201810603266.3

(51) Int. Cl.
*C04B 40/00* (2006.01)
*B33Y 70/00* (2020.01)
(Continued)

(52) U.S. Cl.
CPC .......... *C04B 40/0039* (2013.01); *B33Y 40/10* (2020.01); *B33Y 70/00* (2014.12);
(Continued)

(58) Field of Classification Search
CPC . C04B 40/0039; C04B 14/06; C04B 16/0633; C04B 22/085; C04B 24/2641;
(Continued)

(56) References Cited

FOREIGN PATENT DOCUMENTS

| CN | 104310918 | 1/2015 |
| CN | 105753404 | 7/2016 |

(Continued)

OTHER PUBLICATIONS

"International Search Report (Form PCT/ISA/210)" of PCT/CN2019/090010, dated Aug. 15, 2019, with English translation thereof, pp. 1-5.

(Continued)

*Primary Examiner* — John E Uselding
(74) *Attorney, Agent, or Firm* — JCIP Global Inc.

(57) ABSTRACT

A highly thixotropic 3D printing concrete and a manufacturing method therefor are provided. The weight percentage of each component calculated per cube of concrete is: 35-40% of cement, 0.1-0.4% of polycarboxylate superplasticizer, 0.1-0.4% of polypropylene fiber, 1.0-3.0% of special thixotropic agent for 3D printing concrete, and 12.5-14.5% of water, and the remainder is sand.

8 Claims, 3 Drawing Sheets

(51) Int. Cl.
*B33Y 40/10* (2020.01)
*C04B 14/06* (2006.01)
*C04B 16/06* (2006.01)
*C04B 22/08* (2006.01)
*C04B 24/26* (2006.01)
*C04B 28/04* (2006.01)
*C04B 103/00* (2006.01)
*C04B 103/32* (2006.01)
*C04B 103/48* (2006.01)
*C04B 111/00* (2006.01)

(52) U.S. Cl.
CPC .......... *C04B 14/06* (2013.01); *C04B 16/0633* (2013.01); *C04B 22/085* (2013.01); *C04B 24/2641* (2013.01); *C04B 24/2652* (2013.01); *C04B 28/04* (2013.01); *C04B 2103/008* (2013.01); *C04B 2103/0085* (2013.01); *C04B 2103/32* (2013.01); *C04B 2103/48* (2013.01); *C04B 2111/00181* (2013.01)

(58) Field of Classification Search
CPC ..... C04B 24/2652; C04B 28/04; B33Y 70/00; B33Y 40/10
See application file for complete search history.

(56) References Cited

FOREIGN PATENT DOCUMENTS

| | | |
|---|---|---|
| CN | 106007587 | 10/2016 |
| CN | 107311561 | 11/2017 |
| CN | 108675671 | 10/2018 |
| CN | 108715531 | 10/2018 |
| KR | 101620075 | 5/2016 |

OTHER PUBLICATIONS

"Written Opinion of the International Searching Authority (Form PCT/ISA/237)" of PCT/CN2019/090010, dated Aug. 15, 2019, pp. 1-5.

HIGHLY THIXOTROPIC 3D PRINTING CONCRETE AND MANUFACTURING METHOD THEREFOR

CROSS-REFERENCE TO RELATED APPLICATION

This application is a 371 of international application of PCT application serial no. PCT/CN2019/090010, filed on Jun. 4, 2019, which claims the priority benefit of China application no. 201810603266.3, filed on Jun. 12, 2018. The entirety of each of the above mentioned patent applications is hereby incorporated by reference herein and made a part of this specification.

TECHNICAL FIELD

The disclosure relates to the field of concrete materials, and in particular to a highly thixotropic concrete that satisfies pumpability, extrudability, and good constructability, which specifically relates to a highly thixotropic 3D printing concrete and a manufacturing method therefor.

BACKGROUND

The concept of 3D printing technology was proposed in the 1970s, which is a rapid prototyping technology usually referred to as additive manufacturing. The basic principle thereof is to present a target object on a computer using a 3D model, then divide the model into blocks and layers to be printed layer by layer by a printer, and stack the layers to form a complete object. 3D printing technology is known as the beginning of the "third industrial revolution". With the rapid development of 3D printing technology, people have begun to study the application in the field of construction. Compared with traditional construction methods, 3D printing concrete is environmentally friendly, energy-saving, and safe, which will bring great convenience to mankind if large-scale applications are implemented.

3D printing technology proposes the following special performance requirements for concrete. (1) Rheology: 3D printing concrete generally transports material to a printing head through pumping, so the printing material needs to have good rheology and a certain degree of pumpability. (2) Extrudability: When the printing concrete is extruded through the printing head under pressure, the printing concrete should be able to maintain good uniformity. (3) Constructability: After the material is extruded to a design position, the material must maintain a certain shape, and before a second layer of material is stacked, the first layer of material should have a certain degree of carrying capacity without obvious deformation. The shape maintaining capability depends on the thixotropy and condensing speed of the slurry on the one hand, and on the thickness of the printing layer and the printing speed on the other hand. If the material does not have good shape maintaining capability, it is difficult to print out a design shape.

The functional mechanism of the thixotropic agent is that the thixotropic agent can form a flocculation structure in a cement-based material. When the fresh cement-based material is subjected to shearing action, the formed flocculation structure is broken and fluidity is restored. When the shearing action is stopped, a flocculation structure is reformed in the cement-based material and fluidity is reduced.

At present, most of the cement-based thixotropic agents are applicable to prestressed grouting, self-leveling concrete, and self-compacting concrete. For Embodiment, the application with Application No. 201410283518.0 and title "Thixotropic Agent for Cement-Based System and Manufacturing Method Therefor" is mainly applicable to a system with high fluidity and mainly solves the workability problem of concrete. The application with Application No. 201310459296.9 and title "Water-Retaining Thixotropic Agent for Ready-Mixed Mortar and Manufacturing Method Therefor" is more to improve the water retention and cohesiveness of mortar. The liquid thixotropic agent manufactured by the application with Application No. 201611221165.7 and title "Manufacturing Method for Thixotropic Agent for Cement-based System" is not conducive to the factory production of 3D printing of dry powder for construction. In the application with Application No. 201610894393.4 and title "Thixotropic Agent for Polycarboxylate Superplasticizer, Thixotropic Polycarboxylate Superplasticizer, and Application Therefor", the white carbon black is mainly thixotropic through adsorbing water, while the polycarboxylate superplasticizer releases water between particles through steric hindrance or electrostatic action, which reduces the water consumption of fresh concrete and enhances water consumption and durability. In the application with Application No. 201710567069.6 and title "Environmental-friendly Foam Concrete Block and Manufacturing Method Therefor", sodium lauryl sulfate as a foaming agent do not have a flocculating effect and is not within the category of inorganic salts. At the same time, polyacrylamide as a kind of foam stabilizer does not have the effect of thixotropic early strength. Polyacrylamide can only have the effect of thixotropic early strength within a reasonable dosage range. When the dosage is low, polyacrylamide only has a thickening or thixotropic effect. When the dosage is high, thixotropy is too high, and the material needs a strong shearing force to destroy the flocculation structure, which is difficult to implement fluidity. In response to the problems, 3D printing concrete must adopt a suitable thixotropic agent to satisfy the requirements of fluidity, pumpability, extrudability, and constructability, which will greatly promote the application of 3D printing technology in the construction industry.

At present, most of the cement-based thixotropic agents are applicable to prestressed grouting, self-leveling concrete, and self-compacting concrete, which is not conducive to the factory production of 3D printing of dry powder for construction and is difficult to implement the requirements of fluidity, pumpability, extrudability, and constructability.

SUMMARY

The objective of the disclosure is to provide a highly thixotropic 3D printing concrete and a manufacturing method therefor.

The objective of the disclosure may be achieved through the following technical solutions.

In highly thixotropic 3D printing concrete, the weight percentage of each component calculated per cube of concrete is:

Cement 35-40%
Polycarboxylate superplasticizer 0.1-0.4%
Polypropylene fiber 0.1-0.4%
A special thixotropic agent for 3D printing concrete 1.0-3.0%
Water 12.5-14.5%
The remainder is sand.

In a further solution, the special thixotropic agent for 3D printing concrete is composed of the following raw materials in weight percentage:

Inorganic flocculant 92-98%;
Organic polymer thixotropic early strength agent 1-4%;
Foam stabilizer 1-4%;
The sum of the components is 100%.

The inorganic flocculant is one of magnesium nitrate, iron nitrate, magnesium sulfate, and iron sulfate.

The foam stabilizer is one of calcium lignosulfonate, higher fatty alcohol derivatives, and alkylphenol ethylene oxide.

The organic polymer thixotropic early strength agent is polyacrylamide.

The cement is P.O. 42.5 grade ordinary Portland cement.

The sand is fine sand with a fineness modulus of 2.05.

The polycarboxylate superplasticizer is a powdered polycarboxylate superplasticizer with slump loss resistance.

Another objective of the disclosure is to provide a manufacturing method for highly thixotropic 3D printing concrete, which includes the following steps. Cement, sand, polycarboxylate superplasticizer, polypropylene fiber, and a special thixotropic agent for 3D printing concrete are uniformly mixed to obtain a uniform material. The uniform material and water are added into a mixing pot for mixing for 3 minutes to obtain highly thixotropic 3D printing concrete.

Compared with the prior art, the disclosure has the following beneficial effects.

(1) As an important raw material for manufacturing highly thixotropic 3D printing concrete, the special thixotropic agent for 3D printing concrete effectively improves various performance of highly thixotropic 3D printing concrete. The inorganic flocculant is hydrolyzed in fresh 3D printing concrete to form an alkaline gel (iron hydroxide or magnesium hydroxide). The flocculation structure formed by the agglomeration of suspended particles by the electric neutralization and adsorption bridging of fine particles with polyacrylamide in fresh 3D printing concrete enables fresh 3D printing concrete to have a certain degree of thixotropy. The foam stabilizer may reduce the escape of bubbles during the shearing process, which causes the reduction in fluidity and extrudability of fresh 3D printing concrete and the hardening of surface pores of 3D printing concrete. Polyacrylamide may improve the compactness of 3D printing concrete and has early strength performance. At the same time, sulfate ions or nitrate ions may promote cement hydration. The two effects together implement the shortening of the condensing time of 3D printing of housing materials, and are more conducive to no obvious deformation after loading multiple layers of coverage.

(2) The disclosure has the characteristics of simple raw material acquisition, low cost, and simple manufacturing process, and significantly improves the printability, outer surface flatness, and early strength of 3D printing concrete.

DETAILED DESCRIPTION OF DISCLOSED EMBODIMENTS

Most Preferred Embodiment

The material will be further described in detail below with reference to the drawings and specific embodiments.

All raw materials of the disclosure are commercially available.

A special thixotropic agent for 3D printing concrete is composed of the following raw materials in weight percentage:

Inorganic flocculant 96%;
Organic polymer thixotropic early strength agent 2%;
Foam stabilizer 2%.

In highly thixotropic 3D printing concrete, the weight percentage of each component calculated per cube of concrete is:

Cement 38.0%
Polycarboxylate superplasticizer 0.1%
Polypropylene fiber 0.3%
Water 13.0%
The special thixotropic agent for 3D printing concrete 2.0%
The remainder is sand.

A manufacturing method for highly thixotropic 3D printing concrete includes the following steps. Cement, sand, polycarboxylate superplasticizer, polypropylene fiber, and the manufactured special thixotropic agent are uniformly mixed to obtain a uniform material. The uniform material and water are added into a mixing pot for mixing for 3 minutes to obtain highly thixotropic 3D printing concrete.

A usage method for highly thixotropic 3D printing concrete of the disclosure includes the following steps. Concrete manufactured in the embodiment is pumped or mechanically transported into a printing nozzle of a 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Figure 5:
FIG. 5 is an effect diagram of a performance test of 3D printing concrete obtained in the most preferred embodiment of the disclosure.

The ordinary mortar obtained through the method is tested for printing. The observation results are that: there is no clogging during the printing process, the surface is smoother during extrusion, the flexural strength of concrete is high, there is no cracking, the single-layer printing height of concrete is 13 mm, the 30-layer theoretical height is 390 mm, and the measured 30-layer deformation value is 380 mm. As shown in FIG. 5. Mortar is tested with reference to JC/T336-2011, the 1-day compressive strength and flexural strength are respectively 14.4 MPa and 7.2 MPa; and the 28-day compressive strength and flexural strength are respectively 47.4 MPa and 11.2 MPa. Mortar is tested with reference to GB/T2419-2005, the 6-minute jumping table fluidity is 210 mm and the mortar slump is 7.0 cm.

Embodiments

Embodiment 1

A special thixotropic agent for 3D printing concrete is composed of the following raw materials in weight percentage:

| | |
|---|---|
| Inorganic flocculant | 92%; |
| Organic polymer thixotropic early strength agent | 4%; |
| Foam stabilizer | 4%. |

In highly thixotropic 3D printing concrete, the weight percentage of each component calculated per cube of concrete is:

| | |
|---|---|
| Cement | 35.0% |
| Polycarboxylate superplasticizer | 0.2% |
| Polypropylene fiber | 0.1% |
| Water | 13.0% |
| The special thixotropic agent for 3D printing concrete | 3.0% |

The remainder is sand.

A manufacturing method for highly thixotropic 3D printing concrete includes the following steps. Cement, sand, polycarboxylate superplasticizer, polypropylene fiber, and the manufactured special thixotropic agent are uniformly mixed to obtain a uniform material. The uniform material and water are added into a mixing pot for mixing for 3 minutes to obtain highly thixotropic 3D printing concrete.

A usage method for highly thixotropic 3D printing concrete of the disclosure includes the following steps. Concrete manufactured in Embodiment 1 is pumped or mechanically transported into a printing nozzle of a 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Relevant performance tests are performed on the concrete of the embodiment and the printed structure.

Constructability Evaluation:

Constructability characterizes the capability of a material to be stacked to a certain height without collapsing. A printing nozzle is selected for printing, so that the material is stacked. The constructability is evaluated.

Figure 1:
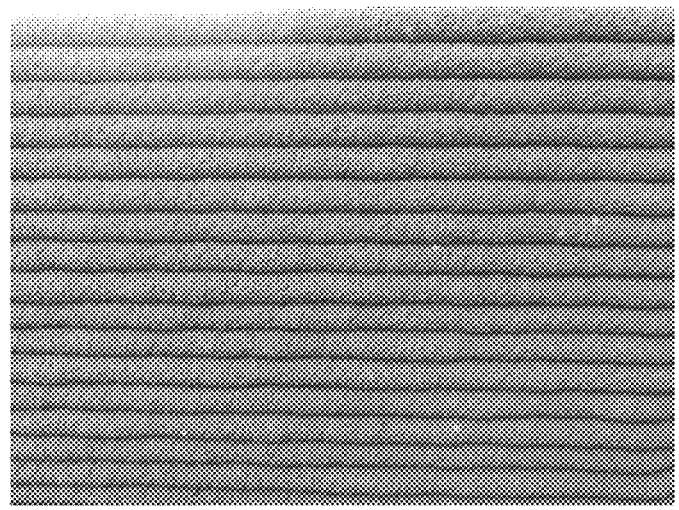
FIG. 1 is an effect diagram of a performance test of 3D printing concrete obtained in Embodiment 1 of the disclosure.

The highly thixotropic concrete obtained according to the formula and manufacturing method provided by the disclosure is tested for printing. The observation results are that: there is no clogging during the printing process, the surface is smooth during extrusion, the flexural strength of concrete is relatively high, there is no cracking, the single-layer printing height of concrete is 13 mm, the 30-layer theoretical height is 390 mm, and the measured 30-layer deformation value is 380 mm. As shown in FIG. 1. Mortar is tested with reference to JC/T336-2011, the 1-day compressive strength and flexural strength are respectively 13.6 MPa and 6.6 MPa; and the 28-day compressive strength and flexural strength are respectively 45.3 MPa and 11.5 MPa. Mortar is tested with reference to GB/T2419-2005, the 6-minute jumping table fluidity is 225 mm and the mortar slump is 8.0 cm.

From the test results, it can be seen that the concrete of the Embodiment may be continuously printed without clogging and can be stacked vertically without collapsing to be printed into a structure under the set parameters of the 3D printer. Also, the printed structure formed after hardening has sufficient compressive strength and flexural strength. The concrete has a certain degree of thixotropy, improved compactness, and early strength performance. At the same time, the condensing time of the printed structure is shortened and is more conducive to no obvious deformation after loading multiple layers of coverage.

Embodiment 2

A special thixotropic agent for 3D printing concrete is composed of the following raw materials in weight percentage:

| | |
|---|---|
| Inorganic flocculant | 95%; |
| Organic polymer thixotropic early strength agent | 4%; |
| Foam stabilizer | 1%. |

In highly thixotropic 3D printing concrete, the weight percentage of each component calculated per cube of concrete is:

| | |
|---|---|
| Cement | 35.0% |
| Polycarboxylate superplasticizer | 0.3% |
| Polypropylene fiber | 0.4% |
| Water | 12.5% |
| The special thixotropic agent for 3D printing concrete | 3.0% |

The remainder is sand.

A manufacturing method for highly thixotropic 3D printing concrete includes the following steps. Cement, sand, polycarboxylate superplasticizer, polypropylene fiber, and the manufactured special thixotropic agent are uniformly mixed to obtain a uniform material. The uniform material and water are added into a mixing pot for mixing for 3 minutes to obtain highly thixotropic 3D printing concrete.

A usage method for highly thixotropic 3D printing concrete of the disclosure includes the following steps. The concrete manufactured in Embodiment 2 is pumped or mechanically transported into a printing nozzle of a 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Figure 2:
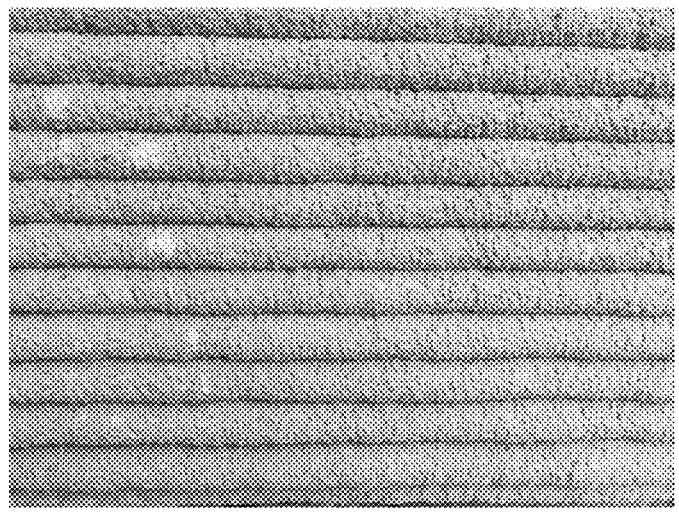
FIG. 2 is an effect diagram of a performance test of 3D printing concrete obtained in Embodiment 2 of the disclosure.

The highly thixotropic mortar obtained according to the formula and manufacturing method provided by the disclosure is tested for printing. The observation results are that: there is no clogging during the printing process, the surface is smooth during extrusion, the flexural strength of concrete is high, there is no cracking, the single-layer printing height of concrete is 13 mm, the 30-layer theoretical height is 390 mm, and the measured 30-layer deformation value is 380 mm. As shown in FIG. 2. Mortar is tested with reference to JC/T336-2011, the 1-day compressive strength and flexural strength are respectively 13.8 MPa and 7.2 MPa; and the 28-day compressive strength and flexural strength are respectively 46.7 MPa and 12.3 MPa. Mortar is tested with reference to GB/T2419-2005, the 6-minute jumping table fluidity is 210 mm and the mortar slump is 7.0 cm.

Embodiment 3

A special thixotropic agent for 3D printing concrete is composed of the following raw materials in weight percentage:

| | |
|---|---|
| Inorganic flocculant | 98%; |
| Organic polymer thixotropic early strength agent | 1%; |
| Foam stabilizer | 1%. |

In highly thixotropic 3D printing concrete, the weight percentage of each component calculated per cube of concrete is:

| | |
|---|---|
| Cement | 35.0% |
| Polycarboxylate superplasticizer | 0.1% |
| Polypropylene fiber | 0.4% |
| Water | 14.5% |
| The special thixotropic agent for 3D printing concrete | 1.0% |

The remainder is sand.

A manufacturing method for highly thixotropic 3D printing concrete includes the following steps. Cement, sand, polycarboxylate superplasticizer, polypropylene fiber, and the manufactured special thixotropic agent are uniformly mixed to obtain a uniform material. The uniform material and water are added into a mixing pot for mixing for 3 minutes to obtain highly thixotropic 3D printing concrete.

A usage method for highly thixotropic 3D printing concrete of the disclosure includes the following steps. The concrete manufactured in Embodiment 3 is pumped or mechanically transported into a printing nozzle of a 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Figure 3:
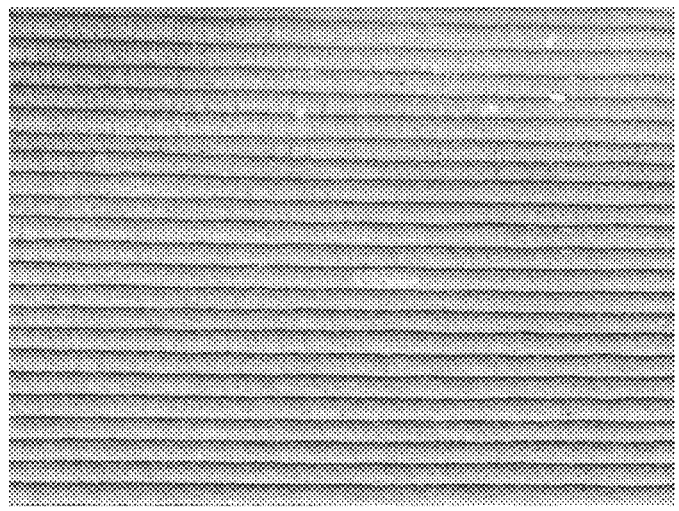
FIG. 3 is an effect diagram of a performance test of 3D printing concrete obtained in Embodiment 3 of the disclosure.

The highly thixotropic mortar obtained according to the formula and manufacturing method provided by the disclosure is tested for printing. The observation results are that: there is no clogging during the printing process, the surface is smooth during extrusion, the flexural strength of concrete is relatively high, there is no cracking, the single-layer printing height of concrete is 13 mm, the 30-layer theoretical height is 390 mm, and the measured 30-layer deformation value is 380 mm. As shown in FIG. 3. Mortar is tested with reference to JC/T336-2011, the 1-day compressive strength and flexural strength are respectively 11.5 MPa and 4.9 MPa; and the 28-day compressive strength and flexural strength are respectively 44.3 MPa and 10.8 MPa. Mortar is tested with reference to GB/T2419-2005, the 6-minute jumping table fluidity is 225 mm and the mortar slump is 9.0 cm.

Embodiment 4

A special thixotropic agent for 3D printing concrete is composed of the following raw materials in weight percentage:

| | |
|---|---|
| Inorganic flocculant | 95%; |
| Organic polymer thixotropic early strength agent | 1%; |
| Foam stabilizer | 4%. |

In highly thixotropic 3D printing concrete, the weight percentage of each component calculated per cube of concrete is:

| | |
|---|---|
| Cement | 40.0% |
| Polycarboxylate superplasticizer | 0.4% |
| Polypropylene fiber | 0.1% |
| Water | 12.5% |
| The special thixotropic agent for 3D printing concrete | 3.0% |

The remainder is sand.

A manufacturing method for highly thixotropic 3D printing concrete includes the following steps. Cement, sand, polycarboxylate superplasticizer, polypropylene fiber, and the manufactured special thixotropic agent are uniformly mixed to obtain a uniform material. The uniform material and water are added into a mixing pot for mixing for 3 minutes to obtain highly thixotropic 3D printing concrete.

A usage method for highly thixotropic 3D printing concrete of the disclosure includes the following steps. The concrete manufactured in Embodiment 4 is pumped or mechanically transported into a printing nozzle of the 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Figure 4:
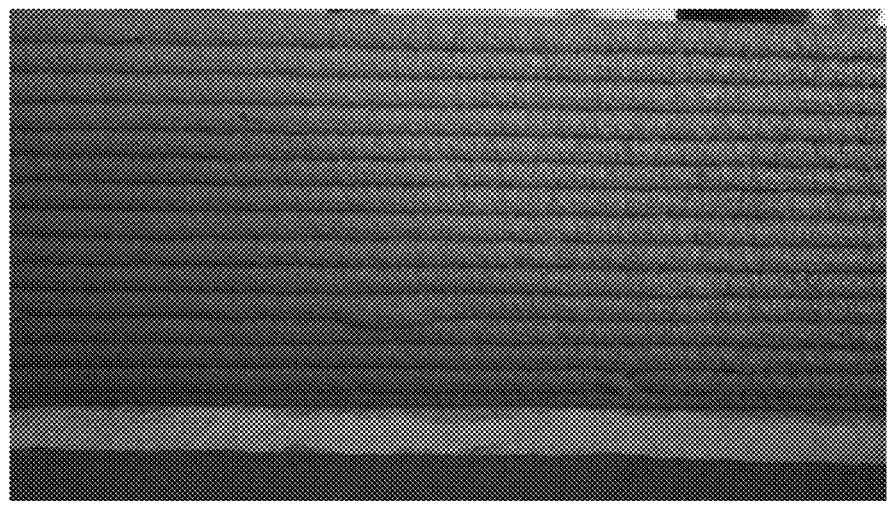
FIG. 4 is an effect diagram of a performance test of 3D printing concrete obtained in Embodiment 4 of the disclosure.

The highly thixotropic mortar obtained according to the formula and manufacturing method provided by the disclosure is tested for printing. The observation results are that: there is no clogging during the printing process, the surface is smoother during extrusion, the flexural strength of concrete is high, there is no cracking, the single-layer printing height of concrete is 13 mm, the 30-layer theoretical height is 390 mm, and the measured 30-layer deformation value is 380 mm. As shown in FIG. 4. Mortar is tested with reference to JC/T336-2011, the 1-day compressive strength and flexural strength are respectively 14.1 MPa and 6.9 MPa; and the 28-day compressive strength and flexural strength are respectively 46.3 MPa and 12.1 MPa. Mortar is tested with reference to GB/T2419-2005, the 6-minute jumping table fluidity is 230 mm and the mortar slump is 9.0 cm.

Embodiment 5

A special thixotropic agent for 3D printing concrete is composed of the following raw materials in weight percentage:

| | |
|---|---|
| Inorganic flocculant | 95%; |
| Organic polymer thixotropic early strength agent | 1%; |
| Foam stabilizer | 4%. |

In highly thixotropic 3D printing concrete, the weight percentage of each component calculated per cube of concrete is:

| | |
|---|---|
| Cement | 40.0% |
| Polycarboxylate superplasticizer | 0.3% |
| Polypropylene fiber | 0.4% |
| Water | 14.5% |
| The special thixotropic agent for 3D printing concrete | 1.0% |

The remainder is sand.

A manufacturing method for highly thixotropic 3D printing concrete includes the following steps. Cement, sand, polycarboxylate superplasticizer, polypropylene fiber, and the manufactured special thixotropic agent are uniformly mixed to obtain a uniform material. The uniform material and water are added into a mixing pot for mixing for 3 minutes to obtain highly thixotropic 3D printing concrete.

A usage method for highly thixotropic 3D printing concrete of the disclosure includes the following steps. The concrete manufactured in Embodiment 5 is pumped or mechanically transported into a printing nozzle of a 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Figure 6:
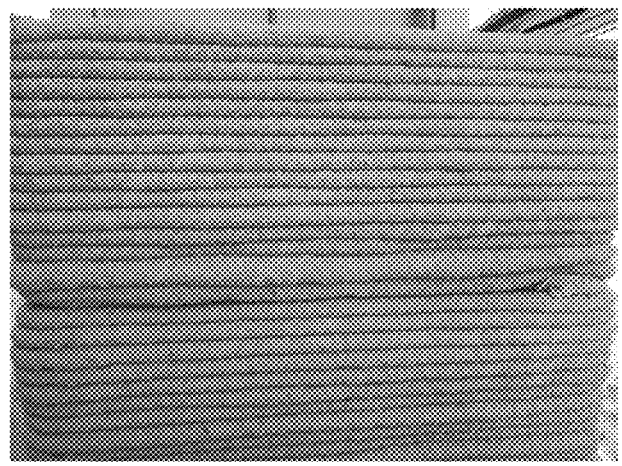
FIG. 6 is an effect diagram of a performance test of 3D printing concrete obtained in Embodiment 5 of the disclosure.

The mortar obtained through the method is tested for printing. The observation results are that: there is no clogging during the printing process, the surface is smoother during extrusion, the flexural strength of concrete is relatively high, there is no cracking, the single-layer printing height of concrete is 13 mm, the 30-layer theoretical height is 390 mm, and the measured 30-layer deformation value is 380 mm. As shown in FIG. 6. Mortar is tested with reference to JC/T336-2011, the 1-day compressive strength and flexural strength are respectively 12.2 MPa and 5.3 MPa; and the 28-day compressive strength and flexural strength are respectively 45.2 MPa and 10.5 MPa. Mortar is tested with reference to GB/T2419-2005, the 6-minute jumping table fluidity is 230 mm and the mortar slump is 9.0 cm.

COMPARATIVE EXAMPLES 1

In 3D printing concrete, the weight percentage of each component calculated per cube of concrete is:

| | |
|---|---|
| Cement | 40% |
| Polycarboxylate superplasticizer | 0.4% |
| Polypropylene fiber | 0.4% |
| Water | 14.5% |
| A special thixotropic agent for 3D printing concrete | 0% |

The remainder is sand.

The manufacturing method for 3D printing concrete includes the following steps. Cement, sand, polycarboxylate superplasticizer, and polypropylene fiber are mixed uniformly to obtain a uniform material. The uniform material and water are added into a mixing pot for mixing for 3 minutes to obtain 3D printing concrete.

The usage method for 3D printing concrete includes the following steps. The concrete manufactured in Comparative Example 1 is pumped or mechanically transported into a printing nozzle of a 3D printer. A pre-designed and sliced 60 cm(length)*60 cm(width)*60 cm flowerpot model is opened on an operating platform of the 3D printer. Click to start printing. The diameter of the printing nozzle is 20 mm, the single-layer printing height is 13 mm, the walking speed is 6 cm/s, and the layer-to-layer interval is 40 s.

Figure 7:
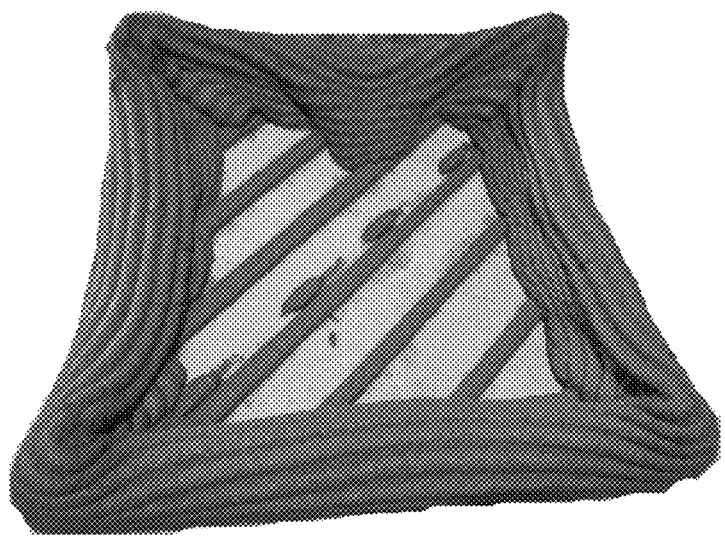
FIG. 7 is an effect diagram of a performance test of 3D printing concrete obtained in Comparative Example 1 of the disclosure.

The lowly thixotropic mortar obtained by the method is tested for printing. The observation results are that: there is no clogging of the site during the printing process, there are cracks on the surface during extrusion, poor roughness, there are holes, the bottom layer is slightly deformed, the vertical surfaces show uneven printing layers, and the overall structure collapses when printing to 10 layers with a height of 120 mm, as shown in FIG. 7. Mortar is tested with reference to JC/T336-2011, the 1-day compressive strength and flexural strength are respectively 9.5 MPa and 4.2 MPa; and the 28-day compressive strength and flexural strength are respectively 36 Mpa and 7.3 MPa. The mortar is tested with reference to GB/T2419-2005, the 6-minute jumping table fluidity is 230 mm and the mortar slump is 9.0 cm.

Comparing the most preferred embodiment, Embodiments 1 to 5, and Comparative Example 1 through the printing effects of the printers and the flexural strengths and compressive strengths, the appearance quality, constructability, and strengths of Comparative Example 1 is far inferior to the most preferred embodiment and Embodiments 1 to 5, which shows the effect of cement on the appearance of concrete, the effect of polypropylene fiber on the mechanical properties of concrete, and the effect of the special thixotropic agent for 3D printing concrete on the thixotropic properties of concrete.

The foregoing descriptions of the embodiments are to facilitate persons skilled in the art to understand and apply the disclosure. It is obvious that persons skilled in the art may easily make various modifications to the embodiments and apply the general principles described here to other embodiments without creative effort. Therefore, the disclosure is not limited to the embodiments here. According to the disclosure, all improvements and modifications made by persons skilled in the art without departing from the scope of the disclosure should fall within the protection scope of the disclosure.

The disclosure uses a special thixotropic agent for 3D printing concrete to manufacture highly thixotropic 3D printing concrete that has good rheological properties, strong foam stabilizing capability, pumpability, extrudability, and constructability, does not crack during printing, has early strength performance, shortens the condensing time of 3D printing, and is conducive to no obvious deformation after loading multiple layers of coverage. The disclosure has simple raw material acquisition, low cost, and simple manufacturing process, significantly improves the printability, outer surface flatness, and early strength of 3D printing concrete, and has industrial applicability.

What is claimed is:

1. A highly thixotropic 3D printing concrete, based on a weight percentage of each component calculated per cube of concrete, comprising:
   35-40% of cement;
   0.1-0.4% of polycarboxylate superplasticizer;
   0.1-0.4% of polypropylene fiber;
   1.0-3.0% of a special thixotropic agent for 3D printing concrete, being composed of following raw materials in weight percentage:
      92-98% of inorganic flocculant, being one of magnesium nitrate, iron nitrate, magnesium sulfate, and iron sulfate;
      1-4% of organic polymer thixotropic early strength agent, being polyacrylamide;
      1-4% of foam stabilizer, being one of calcium lignosulfonate, higher fatty alcohol derivatives, and alkylphenol ethylene oxide; and
      100% of a sum of above components;
   12.5-14.5% of water; and
   a remainder, being sand.

2. The highly thixotropic 3D printing concrete according to claim 1, wherein the cement is P.O. 42.5 grade ordinary Portland cement.

3. The highly thixotropic 3D printing concrete according to claim 1, wherein the sand is fine sand with a fineness modulus of 2.05.

4. The highly thixotropic 3D printing concrete according to claim 1, wherein the polycarboxylate superplasticizer is a powdered polycarboxylate superplasticizer with slump loss resistance.

5. A manufacturing method for a highly thixotropic 3D printing concrete according to claim 1, comprising:
   uniformly mixing cement, sand, polycarboxylate superplasticizer, polypropylene fiber, and a special thixotropic agent for 3D printing concrete to obtain a uniform material; and
   adding the uniform material and water into a mixing pot for mixing for 3 minutes to obtain the highly thixotropic 3D printing concrete.

6. A manufacturing method for a highly thixotropic 3D printing concrete according to claim 2, comprising:
   uniformly mixing cement, sand, polycarboxylate superplasticizer, polypropylene fiber, and a special thixotropic agent for 3D printing concrete to obtain a uniform material; and
   adding the uniform material and water into a mixing pot for mixing for 3 minutes to obtain the highly thixotropic 3D printing concrete.

7. A manufacturing method for a highly thixotropic 3D printing concrete according to claim 3, comprising:
   uniformly mixing cement, sand, polycarboxylate superplasticizer, polypropylene fiber, and a special thixotropic agent for 3D printing concrete to obtain a uniform material; and
   adding the uniform material and water into a mixing pot for mixing for 3 minutes to obtain the highly thixotropic 3D printing concrete.

8. A manufacturing method for a highly thixotropic 3D printing concrete according to claim 4, comprising:
   uniformly mixing cement, sand, polycarboxylate superplasticizer, polypropylene fiber, and a special thixotropic agent for 3D printing concrete to obtain a uniform material; and
   adding the uniform material and water into a mixing pot for mixing for 3 minutes to obtain the highly thixotropic 3D printing concrete.

* * * * *